(12) United States Patent
Yamauchi

(10) Patent No.: US 8,898,695 B2
(45) Date of Patent: Nov. 25, 2014

(54) SELECTIVE DISPLAY OF MESSAGES USING INFORMATION PROCESSING DEVICES

(71) Applicant: International Business Machines Corporation, Armonk, NY (US)

(72) Inventor: Yuhko Yamauchi, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/714,683

(22) Filed: Dec. 14, 2012

(65) Prior Publication Data

US 2013/0160049 A1 Jun. 20, 2013

(30) Foreign Application Priority Data

Dec. 14, 2011 (JP) ................... 2011-273024

(51) Int. Cl.
*H04N 7/10* (2006.01)
*H04N 21/235* (2011.01)

(52) U.S. Cl.
CPC ................. *H04N 21/235* (2013.01)
USPC .............................. 725/32; 725/33

(58) Field of Classification Search
USPC .......... 725/3–36, 106; 709/217–232
See application file for complete search history.

(56) References Cited

U.S. PATENT DOCUMENTS

| | | | | |
|---|---|---|---|---|
| 5,745,837 A * | 4/1998 | Fuhrmann | ...................... | 725/114 |
| 5,802,321 A * | 9/1998 | Buda et al. | .................... | 709/251 |
| 5,822,615 A * | 10/1998 | Yamashita et al. | ............... | 710/10 |
| 6,941,157 B2 * | 9/2005 | Lai et al. | .................... | 455/556.1 |
| 7,269,650 B2 * | 9/2007 | Hamdan | ......................... | 709/224 |
| 8,050,281 B2 * | 11/2011 | Casey et al. | .................... | 370/401 |
| 8,175,516 B2 * | 5/2012 | Nakao et al. | ................. | 455/3.03 |
| 8,682,524 B2 * | 3/2014 | Kitagawa | ......................... | 701/36 |
| 8,711,869 B2 * | 4/2014 | Ishihara et al. | ............... | 370/401 |

FOREIGN PATENT DOCUMENTS

| | | |
|---|---|---|
| JP | 2005117170 A | 4/2005 |
| JP | 2007272906 A | 10/2007 |
| JP | 2008059305 A | 3/2008 |
| JP | 2010044732 A | 2/2010 |
| JP | 2010283519 A | 12/2010 |
| JP | 2011115472 A | 6/2011 |

OTHER PUBLICATIONS

•Enterprise Instant Messaging With IBM Sametime•, [online], Software, Lotus Product, Unified Communications, IBM Sametime, International Business Machines Corporation, [Dec. 8, 2011 Search], Internet <URL:http://www 06.ibm.com/software/jp/Lotus/products/sametime/instant messaging.html>, English translation, 3 pages.

(Continued)

*Primary Examiner* — Annan Shang
(74) *Attorney, Agent, or Firm* — Cantor Colburn LLP

(57) ABSTRACT

Embodiments relate to a method, apparatus and program product for processing messages. The messaging system includes a plurality of information processing devices communicating via a network and an output status determining unit for verifying a first information processing device is connected to a video output device. It also includes a message processing unit configured to provide a message on a first or a second information processing device. The message is provided in a certain manner based on information provided by the output status determining unit.

18 Claims, 14 Drawing Sheets

(56) References Cited

OTHER PUBLICATIONS

•How to Use Windows Live Messenger•, [online], Microsoft Corporation, [Dec. 8, 2011 Search], Internet <URL: http://messengerlive.jp/function/08/index.htm>, English translation, 11 pages.

International Search Report for International Application No. PCT/JP2012/075347; mailed Jun. 20, 2013, 4 pages.

English Translation of International Preliminary Report on Patentability mailed Jun. 26, 2014 for International Application No. PCT/JP2012/075347; International Filing Date: Oct. 1, 2012; 6 pages.

* cited by examiner (A)

(B)

SELECTIVE DISPLAY OF MESSAGES USING INFORMATION PROCESSING DEVICES

PRIORITY

The present application claims priority to Japanese application number 2011-273024 filed Dec. 14, 2011 and all benefits accruing there from under U.S.C. §119, the contents of which is incorporated by reference herein in its entirety.

BACKGROUND

The present invention relates to message handling, and more specifically to selective display of messages using information processing devices.

Instant messaging has gained tremendous popularity in recent years mostly due to the fact that instant messaging enables real-time communication between users. Many instant messaging applications allow other features such as information relating to other users' availability. For example, status availability of a user can be displayed in terms of "in the office" or "out of the office". Instant messaging applications can be provided on a stand-alone basis or be integrated as part of larger overall systems such as groupware, web conferencing systems or other public or private corporate systems. Instant messaging capabilities can also be used to send a broadcast message to more than one user.

Sometimes unfortunate or even embarrassing circumstances occur when messages are sent to unintended recipients or alternatively displayed unintentionally to one or more viewers. One such example of the latter can involve a case where a confidential or personal message is received by a presenter during a meeting. In such a case, the presenter may be using an electronic device connected to an overhead projection unit. The in-coming message is then displayed, even if for an instant, to a general unintended audience.

SUMMARY

Embodiments include a method, system, and computer program product for message processing. Embodiments relate to a method, apparatus and program product for processing messages. The messaging system includes a plurality of information processing devices communicating via a network and an output status determining unit for verifying a first information processing device is connected to a video output device. It also includes a message processing unit configured to provide a message on a first or a second information processing device. The message is provided in a certain manner based on information provided by the output status determining unit.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features, and advantages of the disclosure are apparent from the following detailed description taken in conjunction with the accompanying drawings in which:

DETAILED DESCRIPTION

Unintended display of personal or confidential messages during a presentation is very embarrassing and unwelcome. In some cases, these types of situations occur when the presenter's computer is connected to an overhead projector during the presentation. The originator of the message often sends the message without realizing that the recipient is projecting a presentation. In some cases, personal information may be inconveniently divulged to third parties or confidential information may be divulged to those who do not "need to know". In order to prevent the display of such messages during presentation, an operation has to be performed manually by a user to tell others that he or she is projecting a presentation to prevent the divulging of information. However, most users may not think ahead to perform such an operation prior to the start of the presentation. When a personal or confidential message is received during such presentation, the user needs to then hurriedly disconnect the projector, switch screens by hitting a key, or somehow perform other manual operations to the concealing projected information and prevent its further display for a longer time. This does not change the fact that this information was divulged, even if for an instant, consequently, it is desirable to prevent the divulging of such information in the first place.

In other instances, there are situations, even during a presentation, when it is necessary to continue the exchange of information between one or more participants. Therefore, while some instant messages need to be received during the presentation not all messages are desired to be received. There are also situations in which it is preferable to promptly receive and display messages depending on the sender and the content, or to display a required minimum amount of information depending on the sender and the content. Therefore, it would not be sufficient to simply all reject display of all messages because the recipient is in a meeting or presenting a presentation.

In the present invention, in accordance with one embodiment as will be discussed, a messaging techniques is provided that allows for the control of message display especially during a presentation where the users device may be connected to a projector, an output video device or other such devices as can be appreciated by those skilled in the art.

Figure 1:
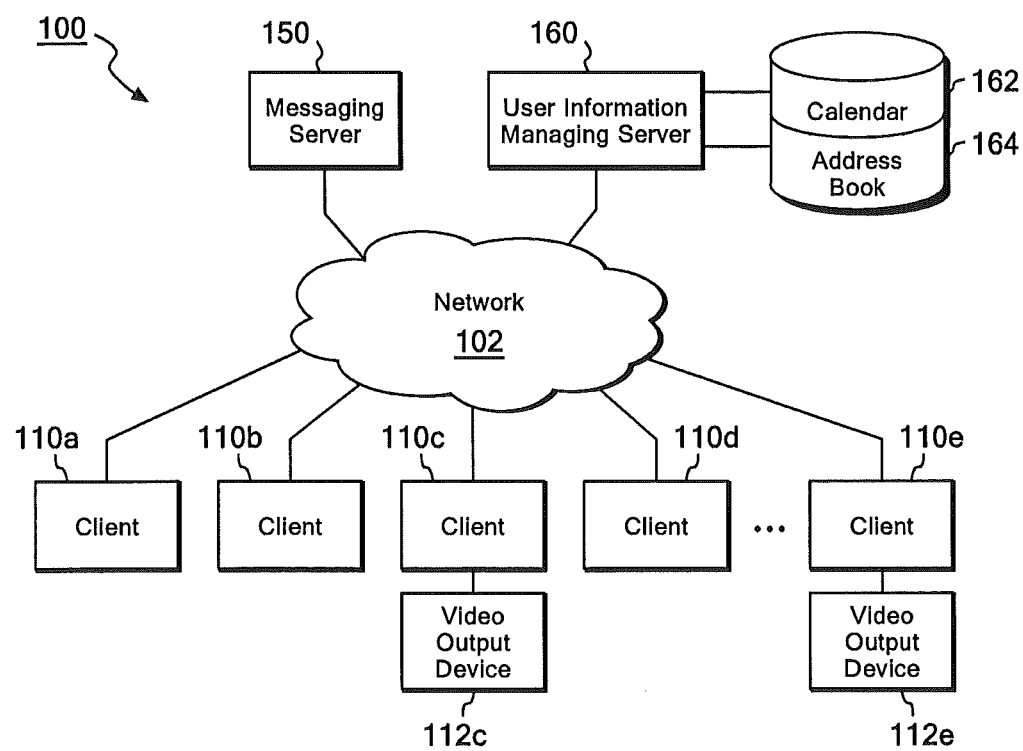
FIG. 1 is an illustration of a schematic diagram of an instant messaging system in accordance with one embodiment.

FIG. 1 is an illustration of a schematic diagram of an instant messaging system in accordance with one embodiment, hereinafter referred to as the "messaging system" for ease of reference. The messaging system 100 shown in FIG. 1 includes a network 102, a plurality of client computers 110a-110e (referred to below simply as "clients") connected to the network 102, a messaging server 150, and a user information managing server 160. There are no particular restrictions on the network 102. It can be a wired or wireless network such as the Internet or a local area network (LAN).

The messaging server 150 includes a server application providing instant messaging capabilities (also referred to as text chat) which enable real-time communication using text and emoticons. The messaging server 150 processes log-in requests to the service from clients 110, manages the presence information for each user, and manages the real-time delivery of messages exchanged by users via the network. There are no particular restrictions on the messaging server 150. However, this can be a general-purpose computer such as a personal computer, a workstation, a blade server, a rack-mount server, or a mid-range server. The explanation of the embodiment focuses on a messaging function using text provided by the messaging server 150. However, in addition to this messaging function, other functions may be provided such as a file-sharing function, voice call function, video call function, and web conferencing function.

The client 110 can include a client application using the instant messaging function provided by the messaging server 150. This provides functions allowing the client 110 to access the messaging server 150, log into the service provided by the messaging server 150, specify the desired user on a contact list, and start a chat session or participate in a chat session started by someone else. The client 110 also sends a message inputted via an inputting means to another user, and displays messages received from other users. There are no particular restrictions on the client 110 and alternates can be provided as can be appreciated by those skilled in the art. In one example, the client can be a general-purpose computer such as a desktop computer, a laptop computer, a mobile computer or tablet computer, or a workstation. The client 110 can also be a portable information terminal such as a portable phone, a smart phone, a tablet terminal or a personal digital assistant (PDA). The client 110 can be provided with an external video output interface such as a video graphics array (VGA), a digital visual interface (DVI), or high-definition multimedia interface (HDMI), and can be connected to an external video output device 112 such as a main display, sub-display or projector. In explanation of the present embodiment, an external video output device 112 is connected via an external video output interface. However, it may also be connected via a universal serial bus (USB), wireless USB, wired local area network (LAN), or wireless LAN.

The user information managing server 160 manages various types of information related to users participating in the messaging system 100. In one embodiment, a calendar 162 and address book 164 are managed. The user information managing server 160 provides information such as user contact list information, user profile information, and user schedule information such as meetings in response to requests from the messaging system 100. The messaging system 100, in one embodiment, has a client-server configuration. However, there are no particular restrictions on the method used to implement instant messaging capabilities. In another embodiment, a peer-to-peer configuration may be used to realize real-time messaging without a messaging server relaying messages.

In the messaging system 100 shown in FIG. 1, when a client 110 (for example, client 110b) projecting a desktop screen using a video output device 112 receives an instant message from another user, the video output device 112 may project the received message. The user sending the message may write something inadvertently, and personal information or confidential information may be divulged on the screen of the video output device 112 unless the sender realizes that the intended recipient is "projecting" something. Therefore, the messaging system 100 in the present embodiment is configured to determine the output status with respect to a video output device 112 of a client 110, and to change messages involving the client 110 based on the output status so that the display of messages on the client 110 or on a client at the other end takes into account the possible divulging of information via a video output device.

Figure 2:
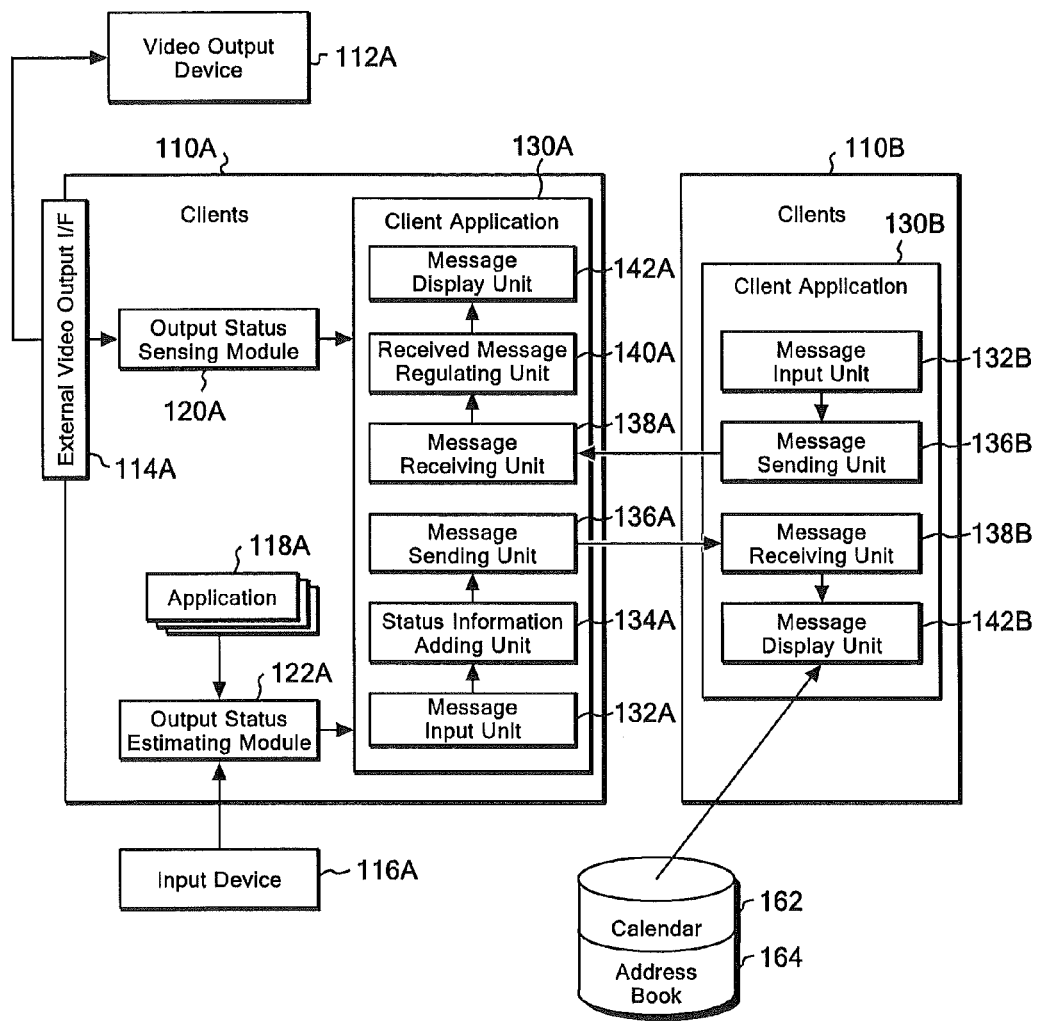
FIG. 2 is an illustration of a functional block diagram realized by a messaging system in accordance with one embodiment.

In FIG. 2 through FIG. 10, message processing is performed in accordance with one or more embodiments that take connectivity status with respect to a video output device or the like into consideration. In FIG. 2, an illustration of a function block diagram is provided for realizing the messaging system in accordance to a first embodiment. In the example provided in FIG. 2, two clients 110A and 110B are participating in a text chat session. In the explanation of the present embodiment, two people are engaged in one-to-one message exchange. However, three or more people may also engage in one-to-one message exchange. The first client 110A is a client connected to an external video output device, and the second client 110B is a client who is exchanging messages with the first client 110A. The second client 110B is not connected to an external video output device, but may be connected to such a device. A messaging client application (referred to below simply as a "client application") 130 is installed on both the first and second clients 110A, 110B. The first client 110A and the second client 110B can be either the sender or recipient in a chat session.

A video output device 112A is connected to the first client 110A via an external video output interface (sometimes referred to below as the "external video output I/F") 114A. The first client 110A includes an output status sensing module 120A and an output status estimating module 122A for determining the output status of the screen with respect to the video output device 112A. The output status sensing module 120 determines the output status with respect to the video output device 112 by detecting signals outputted to the video output device 112 via the external video output I/F 114, and notifies the client application 130.

The connection status and signal output status between a client 110 and a video output device 112 can be explained in the following manner as per this embodiment. First, a default interrupt signal is detected when a connection to the video output device 112 is sensed. In this way, a connection to the video output device 112 is detected. The output status is then acquired via the display data channel (DDC). When there is hardware and a connection interface in which such an interrupt signal has not occurred, a connection to an external video output device 112 is detected by periodically polling the main unit of the client 110. The operating system managing the operations of the client 110 holds in memory the connection status and output status as identification flags. The output status sensing module 120 can detect the output status with respect to a video output device 112 by acquiring these identification flags. As can be appreciated by those skilled in the art, the output status can be provided in a variety of manners. To aid understanding some examples are provided. The output status can be "unconnected", "connected", "preparing for projection" and "projecting" may be indicated using status values. "Unconnected" means a video output device is not connected to an external video output I/F 114. "Connected" means a video output device 112 is connected to an external video output I/F 114, but signals are not being outputted and nothing is being projected. "Preparing for projection" means a video output device 112 has been connected and a projection instruction has been issued, but the video output device 112 is starting up and projection has not yet begun. "Projecting" means a video output device 112 has been connected and the screen on the client 110 is being projected by the video output device 112. "Projecting" can be divided further into "projecting in full-screen mode", meaning full-screen display in which display of windows other than the active window is excluded, and "projecting in normal mode" for all other modes of projection.

The output status estimating module 122 estimates the output status of a screen to the video output device 112 from the operational status to the input device of the client 110, and the client application 130 is notified of the estimated output status. There are no particular restrictions on the input device 116 from which the operational status is acquired to make an estimate. Examples include a mouse, keyboard, touch panel, or remote control with a laser pointer. Here, the operational status includes a time series of linked input operations performed with the input device 116 in addition to static input operations with the input device 116. The output status estimating module 122 can monitor the applications 118 operating on the client 110, and associate a particular operational status with the startup of a particular application to estimate the output status. In a typical presentation application, a display slide transition occurs in response to a key pressing event such as pressing the "enter" key, the "page down" key or the "page up" key, a mouse clicking event such as a single click, double click or track ball operation, a gesture such as tapping or swiping a touch panel, and a remote control button pressing event such as pressing the "page forward" button or the "page back" button. An event triggering a slide transition is referred to below as a slide transition event.

In the output status estimating module 122, patterns for sensing the repeated occurrence of slide transition events over a certain time interval are associated with a "projecting" output status and pre-registered. In this way, when a presentation application has started up, the output status estimating module 122 can detect from the slide transition events described above an operational status unique to a presentation and estimate that the output status is "projecting". In the output status estimating module 122, various patterns, such as patterns for sensing that a key pressing event of a character key or number key not used during a presentation has not occurred within a predetermined period of time, are associated with an output status and pre-registered. The output status estimating module 122A monitors operations with respect to the input device 116A, detects an operational status matching a pre-registered pattern, and estimates that the device has the associated output status. Also, in a typical presentation application, when the ESC key is pressed in full-screen display mode, the screen is released from full-screen display back into normal mode, and display exclusion is released. When display exclusion is released, windows other than the active window are displayed, and received instant messages may be projected. When a particular operational status is sensed, the output status estimating module 122 estimates that the output status is "projecting", and an ESC key pressing operation occurs, a more detailed output status can be estimated, which is "projecting in normal mode".

In the output status determining unit for determining the output status to the video output device 112 in the present embodiment, the output status sensing module 120 and the output status estimating module 122 are both used alone. However, an output status determining unit can be configured in which the output status sensing module 120 and the output status estimating module 122 are used in combination to estimate the output status using the output status estimating mode 122 when the output status sensing module 120 cannot sense the status, and determining the output status by integrating information sensed by the output status sensing module 120A and information estimated by the output status estimating module 122A.

The client application 130 shown in FIG. 2 also includes a message input unit 132, a message sending unit 136, a message receiving unit 138, and a message display unit 142. The message input unit 132 provides a message text input box on the display, and receives messages inputted into the text box. A graphic user interface (GUI) element (for example, a send button) is provided to send messages, and the message input unit 132 responds to a send instruction by having the message sending unit 136 send the message. The message sending unit 136 sends out messages inputted in the text box via a network adapter. A message sent from the first client 110A is delivered to the second client 110B on the other end via the messaging server 150. The message receiving unit 138 receives via the network adapter a message from another party delivered by the messaging server 150, and passes the message to the message display unit 142. The message display unit 142 provides a message display box on the display, adds a sender display, and displays sent messages and received messages in chronological order. In this embodiment, a status information adding unit 134A and a received message regulating unit 140A are provided in the client application 130A of the first client 110A connected to the video display device 112. When a message is sent, the status information adding unit 134 adds status information indicating the status of the client 110 in response to the output status provided by the output status sensing module 120 and/or the output status estimating module 122. In this way, the display of the message on client 110B as the recipient is changed, and a status display indicating the status of client 110A as sender is added based on the output status of client 110A as sender of the message.

The status information can simply be a status value indicating the output status. However, it can also be combined with the presence status or availability of the user ("in a meeting", etc.). For example, "making a presentation" can be indicated based on an output status of "projecting" and a presence status of "in a meeting", or "projecting (able to reply)" can be indicated based on an output status of "projecting" and a presence status of "able to reply". The status display corresponds to the status information. For example, text or an icon can be displayed to indicate "projecting" or "making a presentation", and the text or icon can be associated with a message by, for example, adding it to the beginning or end of the message. The received message regulating unit 140 regulates the display of received messages based on the output status indicated by the output status sensing module 120 and/or the output status estimating module 122. The display is restricted by applying a predetermined display regulatory policy to determine whether or not display of a message has to be restricted. In this way, display of a received message that has to be restricted based on the output status of the first client 110A as recipient of the message is changed on the first client 110A, and restricted message display is performed. A restricted message display can include hiding or substituting some or all of the message with respect to the sender and body of the message. For example, in response to the output status "projecting", a message and sender can be hidden, and substituted by a notice simply indicating that a message has been received. There are no particular restrictions on restricted message display. For example, the restrictions can be lifted after the fact in response to an explicit display instruction or in response to a change in output status that does not require regulated display (for example, a change to an output status other than "projecting").

In response to the indicated output status, the received message regulating unit 140 may automatically reply to the sender of a message with a message including status information indicating the status of the client 110A as recipient. In this way, a status display indicating the status of the first client 110A is added to the reply message displayed on the second client 110B, which is the original sender of the message. The message display unit 142B on the client 110B includes a status display in addition to the received message when a message including status information has been received by the message receiving unit 138B. The added status display can include event processing for calling up a detailed status display detailing the status of the first client 110A in response to a specific operational event with respect to the status display such as repositioning the cursor and clicking a mouse button.

In addition to privacy-protecting information, a calendar 162 and address book 164 managed by the user information managing server 160 can include public information such as a user's organization information (department, group, job title) and a user's scheduled meeting information (meeting name, meeting organizer, meeting place, attendees). The detailed status display is generated from public information on the user of the client 110A, and is intended to provide the user of the second client 110B with detailed status information on the first client 110A.

FIG. 3 through FIG. 5 and FIG. 6 through FIG. 10 provide an illustration of a message sending process and a message receiving process as per one or more embodiments of the invention. Almost in all cases, the embodiments that provide for an example where an output status is provided with respect to connectivity of a video output device.

Figure 3:
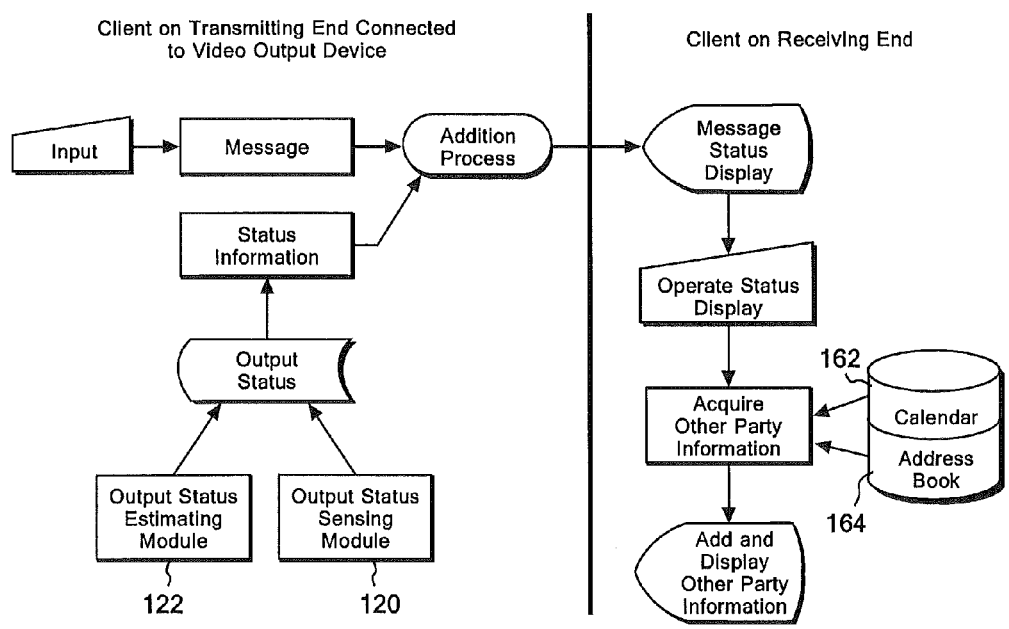
FIG. 3 is a depiction of a diagram depicting the flow of messages accordance with one embodiment.

In FIG. 3, an illustration of a diagram is provided to provide better understanding of the flow of messages in the message sending process of an embodiment of the present invention. The message flow for sending a message begins when a message input unit 132 receives a message to be sent via the input text box on the sending client 110A connected to the video output device 112. Meanwhile, status information is generated in response to the output status determined by the output status sensing module 120A and the output status estimating module 122A. The message is processed by the status information adding unit 134A to add status information in response to the output status, and the resulting message is sent to the receiving client 110B by the message sending unit 136A.

Message display and status display are performed by the receiving client 110B using the received message and status information. When a specific operation is performed such as moving the mouse cursor over the status display, the user's organizational information and meeting information are acquired from the calendar 162 and the address book 164 via the messaging server 150. For example, additional information detailing the status of the sender can be displayed in a pop-up. The receiving client 110B acquires information from a calendar 162 and an address book 164 in the user information managing server 160. However, in another embodiment, the sending client 110A could acquire information from a calendar 162 and an address book 164 in the user information managing server 160, incorporate this information into the status information, and send a message with detailed status information to the receiving client 110B.

Figure 4:
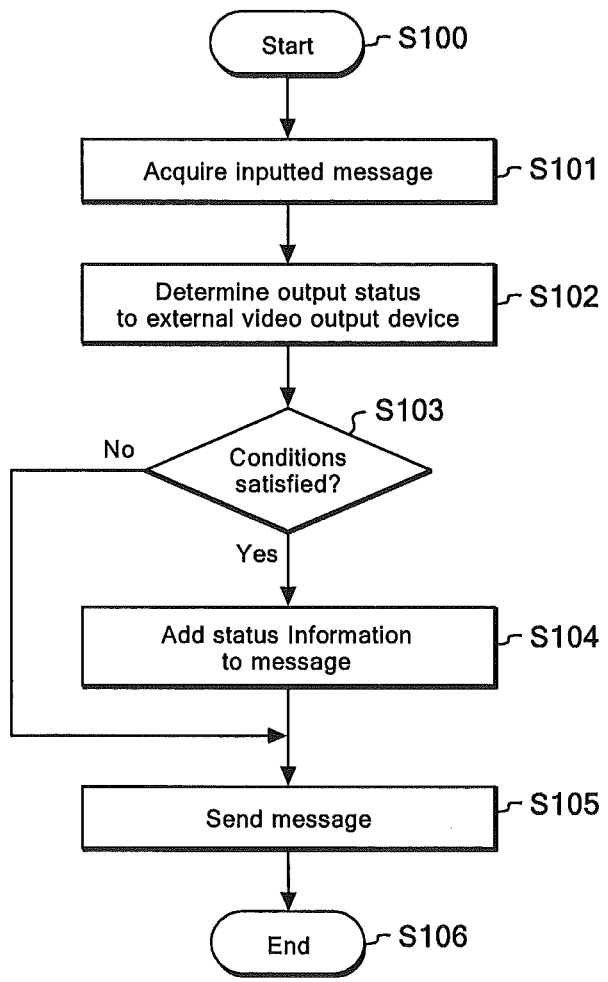
FIG. 4 is a flowchart illustration of a message sending process executed by a sending client as per one embodiment in relation to an output status with respect to a video output device in accordance with one embodiment.
Figure 5:
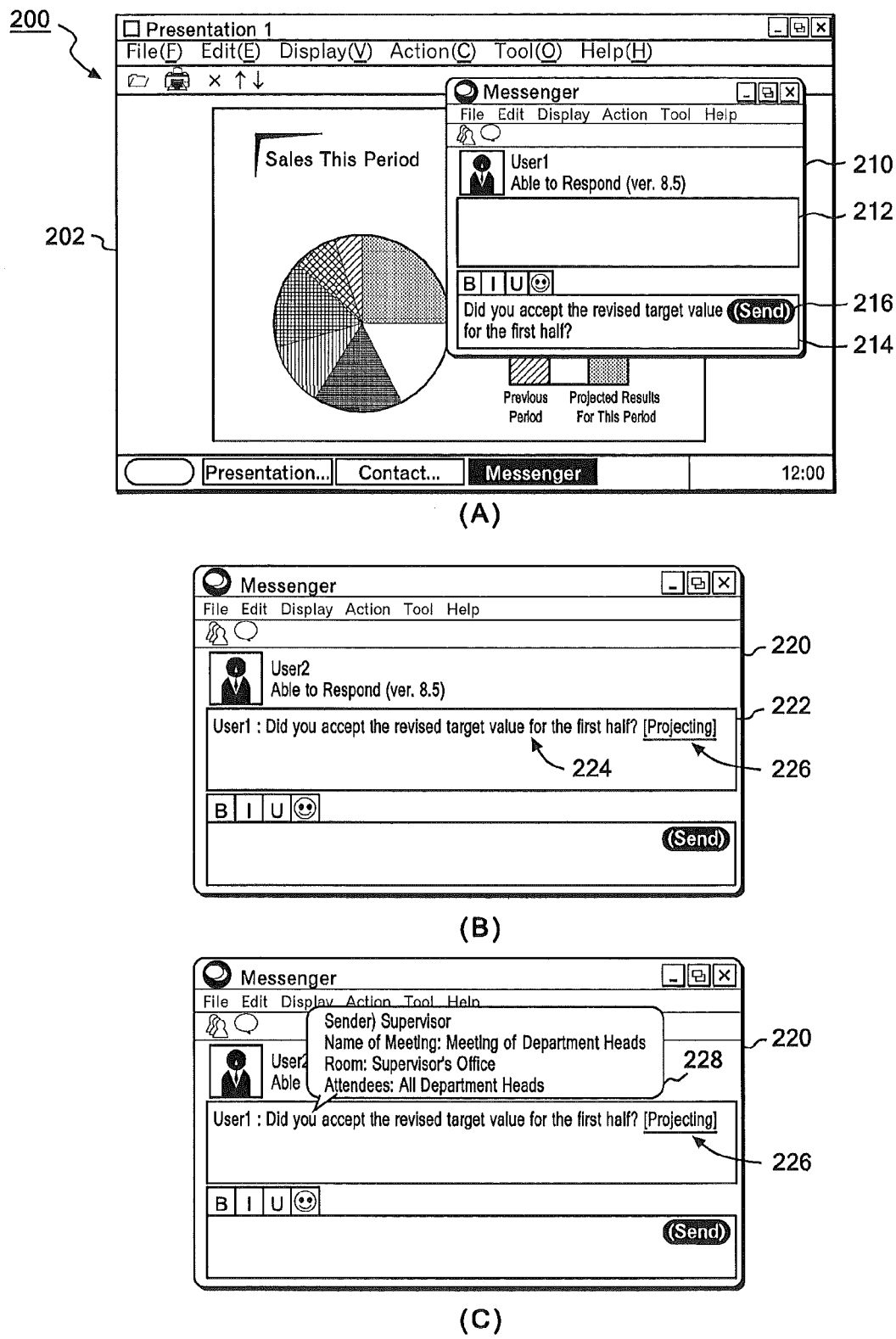
FIG. 5 is an illustration of an example depicting a display screen in accordance with one embodiment.

FIG. 4 provides a flowchart depicting the message sending process executed by the sending client in one embodiment of the present invention. FIG. 5 provides an illustration of a diagram showing a display screen as per one example. The display is used to display messages and is associated to client 110 in this example. FIG. 5(A) specifically depicts a desktop screen displayed on the sending client 110A connected to the video output device 112A. As shown in FIG. 5(A), the desktop screen 200 on the sending client 110A includes a presentation window 202, and a chat window 210 arranged on top of the presentation window 202. The chat window 210 includes a message display box 212 for displaying a sent or received message, a message text input box 214, and a send button 216.

Referring back to FIG. 4, the process starts with Step S100 when a message is entered in the message text input box 214 shown in FIG. 5(A), and the send button 216 is clicked. In Step S101, the sending client 110A acquires the inputted message to be sent. In the example shown in FIG. 5(A), the message acquired says "Did you accept the revised target value for the first half?" In Step S 102, the sending client 110A determines the output status with respect to the external video output device 112. In Step S103, the sending client 110A determines from the output status whether or not predetermined conditions have been met. For example, it determines whether or not predetermined conditions have been met for the output status "projecting". When it has been determined in Step S103 that the predetermined conditions have been met (YES), the process advances to Step S104. In Step S104, the sending client 110A adds status information to the message. In Step S105, a message including status information is sent to the recipient via the messaging server 150. In Step S106, the process is ended.

By contrast, FIG. 5(B) depicts an example of a chat window including a status display which is displayed on the receiving client 110B. In the chat window 220 shown in FIG. 5(B), the message 224 is displayed in a message display box 222. The status display 226 "projecting" is added to the beginning of the message 224 in response to the process for adding status information. When a specific operational event has occurred such as placement of the mouse cursor over the status display 226 in the chat window, a balloon display 228 pops up over the chat window 220 as shown in FIG. 5(C). The balloon display 228 includes information on the meeting currently being attended by the sender. There are no particular restrictions on the balloon window 228. In the example shown in FIG. 5(C), the balloon window includes the sender's attribute information, the name of the meeting attended by the sender, the location, and the attendees.

Referring back to FIG. 4, when it has been determined in Step S103 that the predetermined conditions have not been met and a status display is not required (NO), the process advances directly to Step S105. For example, when the output status is "unconnected" or "connecting", there is little need to notify the recipient of this status, so it is determined that the predetermined conditions have not been met in Step S103. In this case, in Step S105, the sending client 110A sends the message to the recipient via the messaging server 150, and the process ends in Step S106. By sending messages processed so as to take into account the output status with respect to a video output device, the status of the sender can be conveyed to the user of the receiving client 110B without the user of the sending client 110A having to perform a special operation. For example, the user of the receiving client 110B can learn from the status display that the sender is making a presentation, refrain from writing personal information that should not be viewed by third parties, select wording appropriate to the sender's situation, and send a message. Thus, communication via instant messaging is not interrupted and does not interfere with the progress of the meeting. Because the status display is associated with a message, the current status of the sender is emphasized when the user of the receiving client 110B is composing a reply. In addition, the detailed status of the sender can be conveyed to the user of the receiving client 110B via the detailed status display. For example, the user of the receiving client 110B can learn from the detailed status display that a particular user is a participant in the sender's meeting, and send a message to that particular user.

Figure 6:
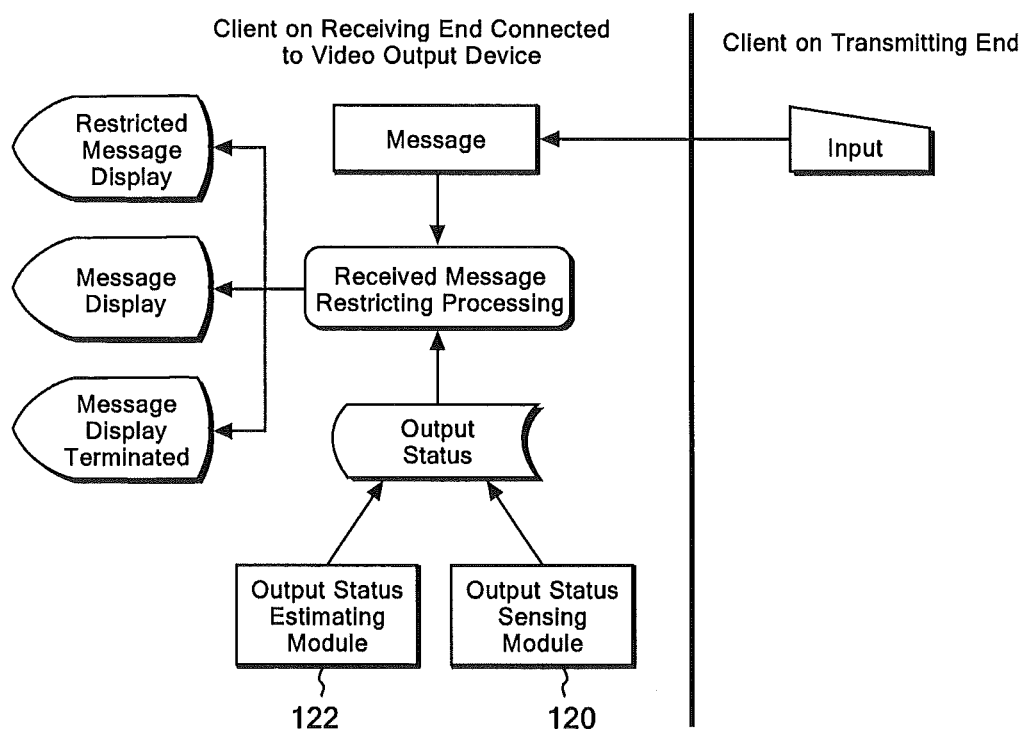
FIG. 6 is an illustration of a diagram depicting a relationship between message flow and output connectivity status in accordance with one embodiment.

FIG. 6 is an illustration of a diagram providing the flow of messages in an alternate embodiment. In the depiction of this message flow for receiving a message, a sending client 110B communicating with a receiving client 110A connected to a video output device 112 starts the flow by entering a message and issuing a send instruction. The message is first sent to the receiving client 110A by the sending client 110B. The receiving client 110A connected to a video output device 112 receives the message via the message receiving unit 138A which passes the message to the received message regulating unit 140A. The output status is communicated to the received message regulating unit 140A by the output status sending module 120A and the output status estimating module 122A. The message is processed by the received message regulating unit 140A in accordance with the display regulation policy and in response to the indicated output status, and the message display unit 142A displays the message in the message display box according to a display method based on the output status. The display of messages depends on the indicated output status. The message is simply displayed in the usual manner when the output status is "not connected" or "connecting", and a restricted message is displayed or display of a message is prevented depending on the content of the received message when the output status is "projecting".

Figure 7:
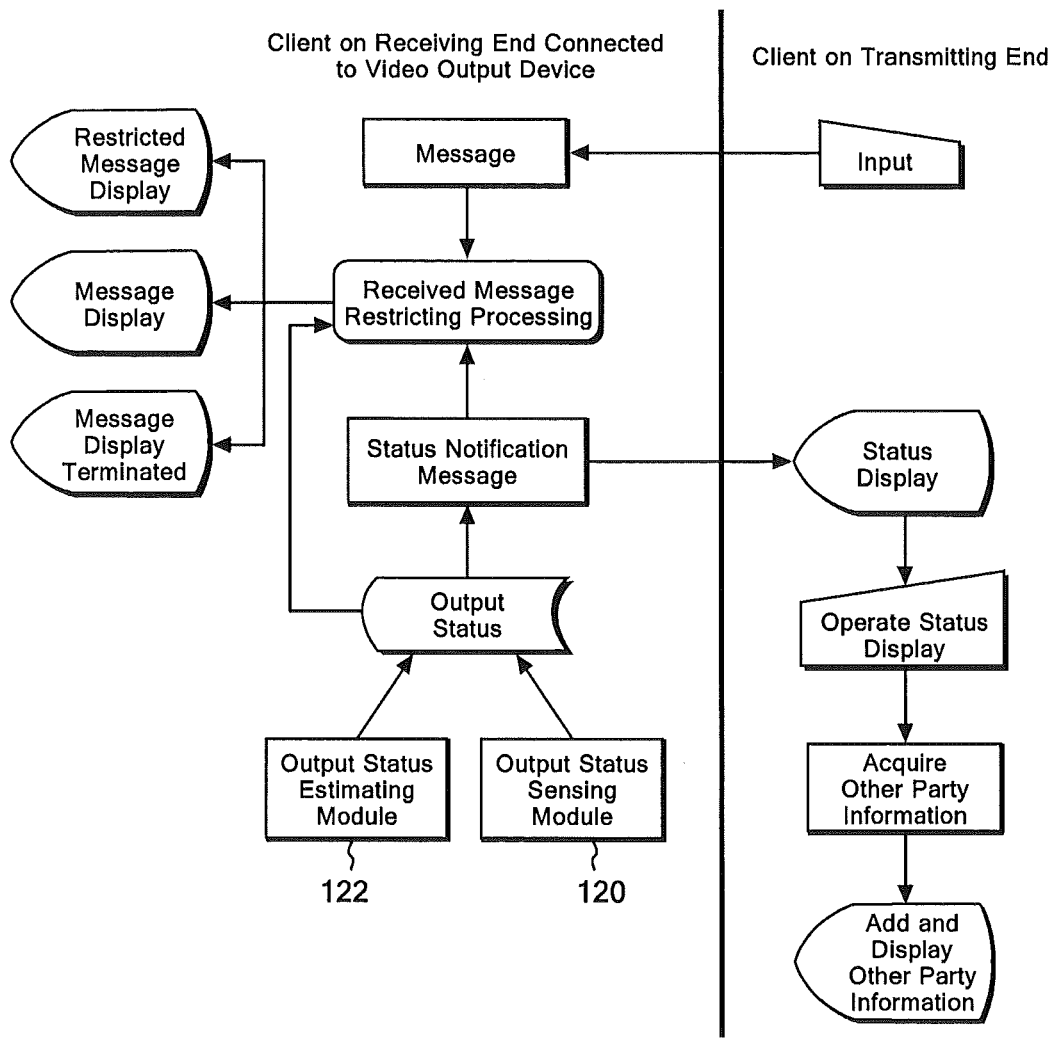
FIG. 7 is an illustration of a flow diagram as per an alternate embodiment depicting a flow of messages in relation to output connectivity status.

FIG. 7 is an illustration of a diagram that depicts the flow of messages in yet another embodiment. This message flow, like the message flow described above, is started when a message is entered and a send instruction issued by the sending client 110B. The message is sent to the receiving client 110A from the sending client 110B. The message receiving unit 138A in the receiving client 110A receives the message and passes the message to the received message regulating unit 140A. At this time, the received message regulating unit 140A is notified of the output status by the output status sensing module 120A and the output status estimating module 122A. The received message regulating unit 140A processes the message in accordance with the indicated output status, and the message display unit 142A displays the message in the message display box using a display method based on the output status. In the message flow shown in FIG. 7, there is another branch in which an automatic reply is made to the message when the output status is, for example, "projecting". The automatic reply message is a status notification message including status information based on the output status, and this message is sent by the message sending unit 136A to the other client 110B. The other client 110B displays the received status notification message. The status notification message includes a "projecting" status display. As in the message flow for sending messages, an additional information display detailing the status of the other party is displayed when, for example, the mouse cursor is placed over the status display.

Figure 8:
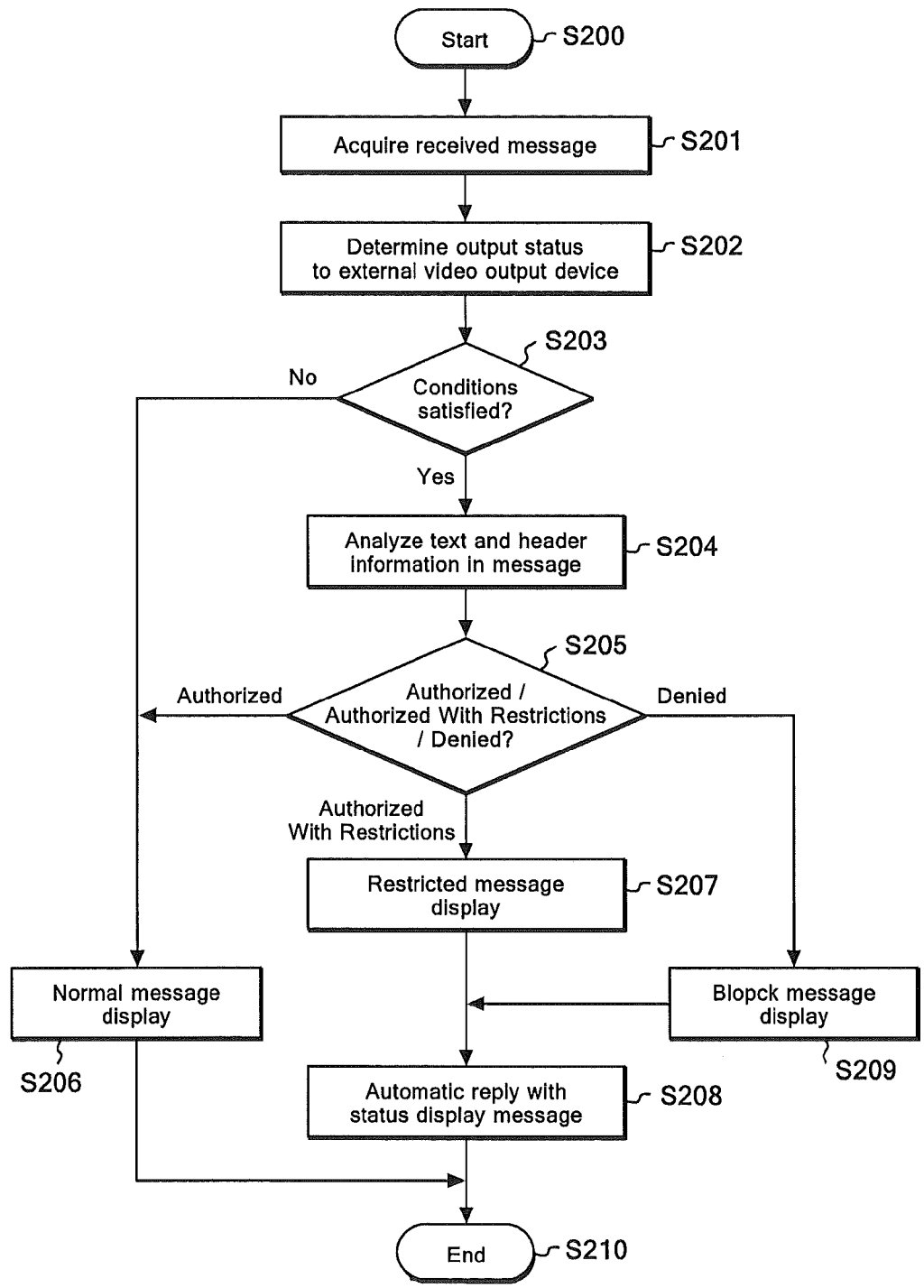
FIG. 8 is an illustration of a flowchart depicting message flow in relation to connectivity status when one or more messages are executed by a user or a client in accordance with one embodiment.
Figure 9:
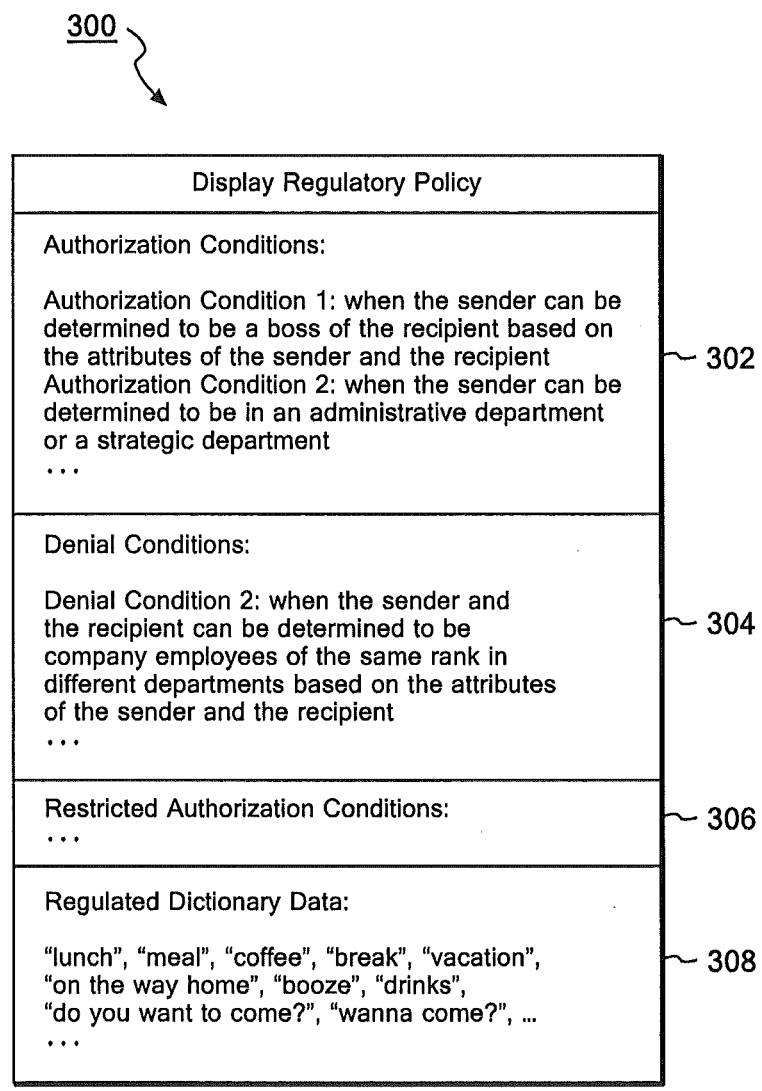
FIG. 9 is an illustration of a diagram depicting data structure of a regulatory policy referenced by one or more received messages in accordance with one embodiment.
Figure 10:
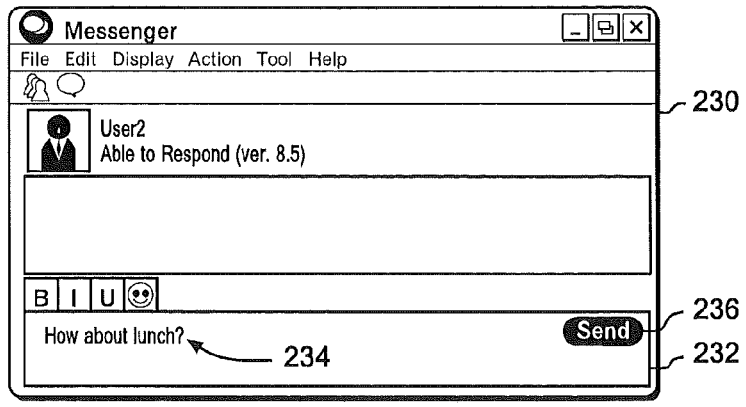
FIG. 10 is an illustration of an example depicting a display screen in accordance with one embodiment.
Figure 10:
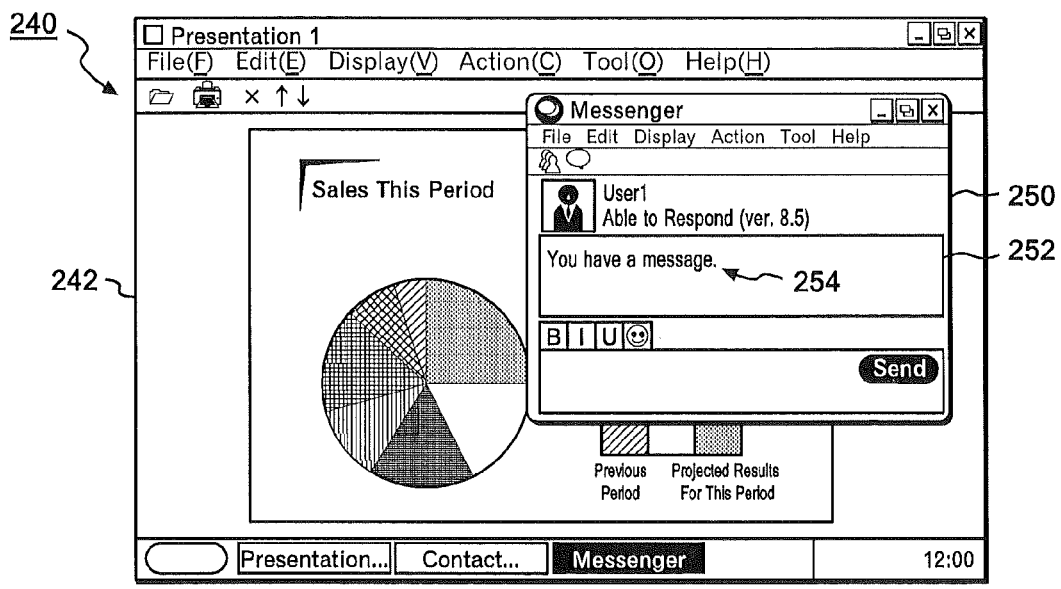

FIG. 8 is the illustration providing a flowchart showing a message receiving process in one embodiment. FIG. 9 is an illustration depicting a diagram showing the data structure of a regulatory policy referenced by the received message regulating unit of the present embodiment. FIG. 10 is an illustration of a diagram showing a display screen displayed on a client 110 in the present embodiment. FIG. 10(A) shows an example of a chat window displayed on the sending client 110B.

In FIG. 8, a message 234 is entered in the message text input box 232 on top of the chat window 230 in the sending client 110B shown in FIG. 10(A), the send button 236 is clicked, and the message is sent. The process starts with Step S200 when this message is received. In Step S201, the receiving client 110A acquires a received message delivered by the messaging server 150. In the example shown in FIG. 10(A), the acquired message says "How about lunch?" In Step S202, the receiving client 110A determines the output status with respect to the external video output device 112. In Step S203, the receiving client 110A determines whether the output status meets a predetermined condition. Here, as when a message is sent, the condition to be determined is whether the output status is "projecting". When it has been determined in Step S203 that the predetermined condition has been met (YES), the process advances to Step S204. In Step S204, the receiving client 110A analyzes the body of the message and the header information using the display regulatory policy. The display regulatory policy is data with the data structure shown in FIG. 9 which describes the conditions for restricted display. The display regulatory policy 300 shown in FIG. 9 includes an authorization condition section 302, a denial condition section 304, a restricted authorization condition section 306, and a regulated dictionary data section 308. The authorization condition section 302 describes the conditions for authorizing display of a message without any restrictions. The denial condition section 304 describes the conditions for not authorizing display. The restricted authorization condition section 306 describes the conditions for authorizing display with restrictions. Condition sections 302-306 establish the conditions for authorizing display, authorizing restricted display, and denying display of a message based on attribute information on the sender and recipient of a message. For example, when the sender is the boss of the user of receiving client 110A, display is authorized. In all other situations, display is not authorized. When the sender belongs to an administrative department or strategic department, display is not authorized. In all other situations, display can be authorized. These conditions can be defined beforehand in accordance with the management policies of the organization.

Specific expressions such as personal expressions included in messages are registered in the regulated dictionary data section 308. This describes what is allowed with restrictions and what is prohibited in the display of messages. The regulated dictionary data section 308 also includes keywords and expressions commonly used in personal messages, expressions appended to the ends of sentences (expressions indicating a friendly tone), in-house project names, and undisclosed product names. The specific expressions are defined beforehand in accordance with the management policies of the organization. Because instant messages are usually short, a regulated message can be identified if it contains at least one particular expression. However, there are no particular restrictions on how regulated messages are identified. For example, a score can be calculated from the types of specific expressions and number of specific expressions contained in a message, and a message whose calculated score exceeds a certain level can be identified as a regulated message. A morphological analysis can also be performed on messages to identify regulated messages with greater precision. When a message includes the expression "How about lunch?" as shown in FIG. 10(A), it can be identified as a regulated message because it includes the word "lunch" which is registered in the regulated dictionary data section 308. When a message is subject to regulation, the message can be displayed with restrictions or display of the message can be prohibited.

Referring back to FIG. 8, the process branches at Step S205 depending on whether the results of the display regulation policy in Step S204 are authorized, authorized with restrictions, or denied. When a message is authorized in Step S205 (authorized), the process branches to Step S206. The message is displayed normally in Step S206, and the process ends in Step S210. When the specific conditions are not met in Step S203 and regulated display is not deemed necessary (NO), the process advances directly to Step S206, and the message is displayed normally. When a message is authorized with restrictions in Step S205 (authorized with restrictions), the process branches to Step S207. In Step S207, the message is displayed with restrictions. An automatic reply including a status display is issued in Step S208, and the process is ended in Step S210. When a message is denied in Step S205 (denied), the process branches to Step S209. In Step S209, display of the method is prevented, an automatic reply including a status message is issued in Step S208, and the process is ended in Step S210.

FIG. 10(B) is an example of a desktop screen displayed on the receiving client 110A in which a message has been displayed with restrictions. In the example shown in FIG. 10(B), the message "a message has been received" is displayed in the message display box 252 of the chat window 250 instead of the message "How about lunch?". The screen shown in FIG. 10(B) is an example. A message can be displayed with restrictions by blacking out sections including specific expressions, or displaying only the sender. When the conditions in Step S203 are not met or a GUI item for receiving an explicit display instruction from the user is operated, display of the restricted message can be discontinued and the delayed message displayed. By performing the processing described above to receive messages while taking into account the output status with respect to a video output device, a received message can be identified as a restricted message based on the content and sender of a received message, and the restricted message can be displayed in accordance with the output status of the client 110A receiving the message with respect to the video output device 112A. In this way, a user receiving messages does not have to worry that messages will contain private information, and does not have to disconnect the external video output I/F 114 in a panic or quickly hit the exit key to haphazardly deal with these situations and limit the divulgence of this information to a brief period of time. In this embodiment, status information is added to send messages or display restrictions were placed on received messages by the client 110A connected to the video output device 112. However, message processing involving the client 110A connected to the video output device 112 as sender or recipient does not have to be performed by the client 110A. The message processing can also be performed by the messaging server 150 or the other client 110B.

Figure 11:
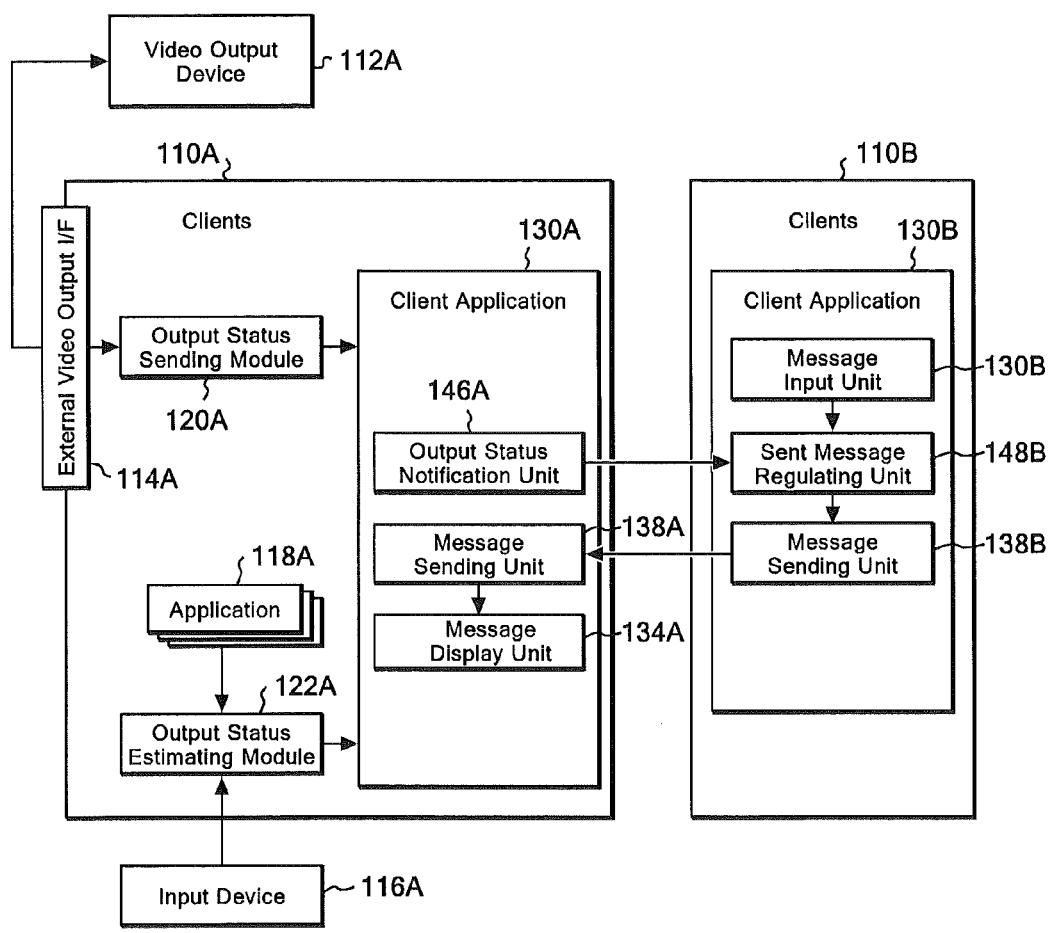
FIG. 11 is an illustration of a functional block diagram depicting a messaging system in accordance with an alternate embodiment.
Figure 12:
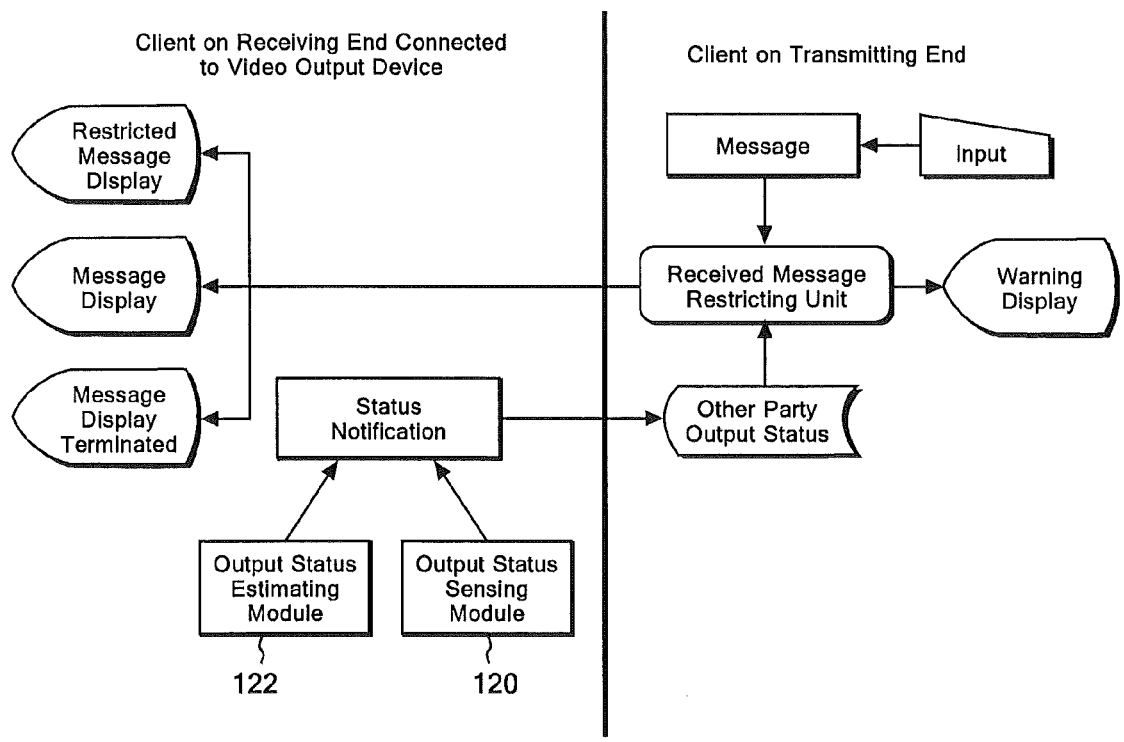
FIG. 12 is an illustration of a diagram depicting receiving messages in accordance with an embodiment that takes into account the output status connectivity with respect to a video output device.
Figure 13:
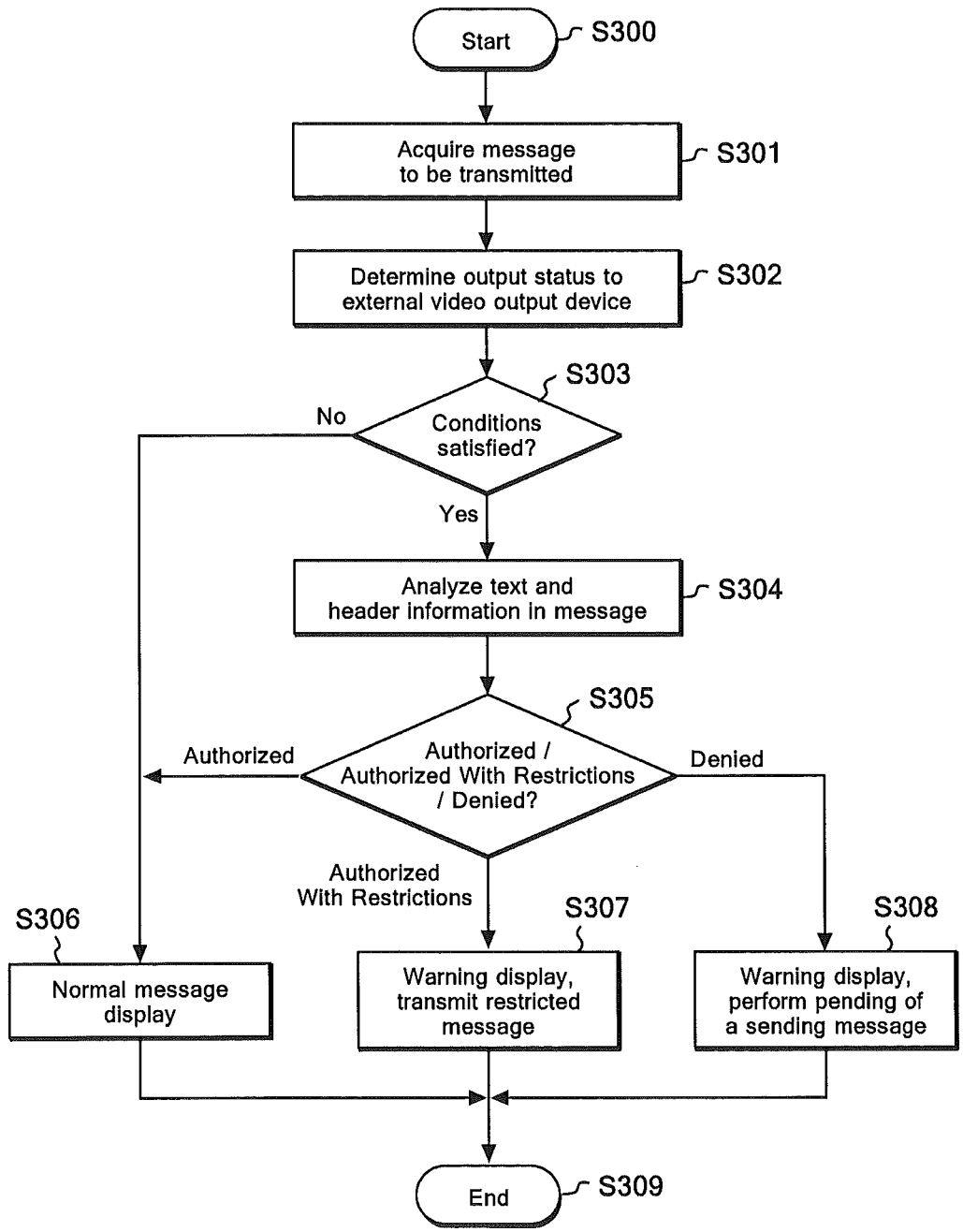
FIG. 13 is an illustration of a flowchart depicting sending of a message when the message is executed by a sending client in accordance with one embodiment.

FIG. 11 through FIG. 13 are illustrations used to provide an alternate embodiment in which message processing is performed by the other client 110B and not the client 110A connected to the video output device 112. In the embodiment shown in FIG. 11, the client application 130A in the client 110A connected to the video output device 112 includes an output status notification unit 146A, and the client application 130B in the other client 110B includes a sent message regulating unit 148B. The output status notification unit 146 notifies the other client 110B of the output status determined by the output status sensing module 120 and/or the output status estimating module 122. When notification is received, the sent message regulating unit 148 in the other client 110B regulates the sending of messages based on the received output status. When a message is identified as needing regulation on the basis of the output status of the first client 110A which is the recipient of the message, display of the message on the first client 110A is changed, or a restricted message is displayed.

FIG. 12 is an illustration of a diagram used depicting message flow for receiving messages, specifically. The message input unit 132B in the sending client 110B on the other end receives a message to be sent via the text input box and the process is started. The output status determined by the output status sensing module 120A and the output status estimating module 122A in the receiving client 110B is conveyed to the sending client 110A by the output status notification unit 146A. The message to be sent is processed by the sent message regulating unit 148B using the display regulation policy in accordance with the received output status and the message is sent to the receiving client 110A by the message sending unit 136B.

The message sending process branches according to the received output status. For example, when the output status is "unconnected" or "connecting", the message is sent in the usual manner without any further processing. When the output status is "projecting", a restricted message is sent or the sent message is placed in pending status based on the content of the sent message. A restricted message can include changes such as hiding or substituting some or all of the message in relation to the sender and body of the message. When the output status is "pending", the message and sender can be hidden, or a substitute message can be display simply indicating that a message has been received. When as a result of applying the policy, a restricted message has been identified, a warning can be displayed on the sending client 110B indicating that the recipient is projecting, and the user can be prompted to reenter the message.

FIG. 13 is a flowchart depicting the message sending process of an alternate embodiment. The process shown in FIG. 13 begins with Step S300 when a message 234 is entered in the message text input box 232 in the chat window on the sending client 110B shown in FIG. 10(A) and the send button 236 is clicked. In Step S301, the sending client 110B acquires the message to be sent. In the example shown in FIG. 10(A), a message saying "How about lunch?" is acquired. In Step S302, the sending client 110B determines the previously received output status of the receiving client 110A with respect to the external video output device 112. In Step S303, the sending client 110B determines whether or not predetermined conditions have been met from the output status. Here, the condition that can be determined is whether or not the output status is "projecting". When it has been determined in Step S303 that the predetermined condition has been met (YES), the process advances to Step S304. In Step S304, the sending client 110B analyzes the body of the message and the header information using the display regulatory policy. When the message includes the expression "How about lunch?" as shown in FIG. 10(A), it is identified as a regulated message because it includes the word "lunch" which is registered in the regulated dictionary data section 308.

The process branches at Step S305 depending on whether the results of the display regulation policy in Step S304 are authorized, authorized with restrictions, or denied. When a message is authorized in Step S305 (authorized), the process branches to Step S306. When the specific conditions are not met in Step S303 and regulated display is not deemed necessary (NO), the process advances directly to Step S306. In Step S306, the message is displayed normally. In Step S309, the process is ended. When a message is authorized with restrictions in Step S305 (authorized with restrictions), the process branches to Step S307. In Step S307, the sending client 110B displays the appropriate warning, and sends a restricted message. In Step S309, the process is ended. A restricted message can be sent so as to include changes to the content of the message. For example, a substitute message can be displayed simply indicating that a message has been received. When a message is denied in Step S305 (denied), the process branches to Step S308. In Step S308, the sending client 110B places sending of the message into pending mode. In Step S309, the process is ended. The pending message in Step S308 can be released and sent on a delay after the fact when an explicit send instruction is received or when the output status changes to a status that does not require restricted display.

Figure 14:
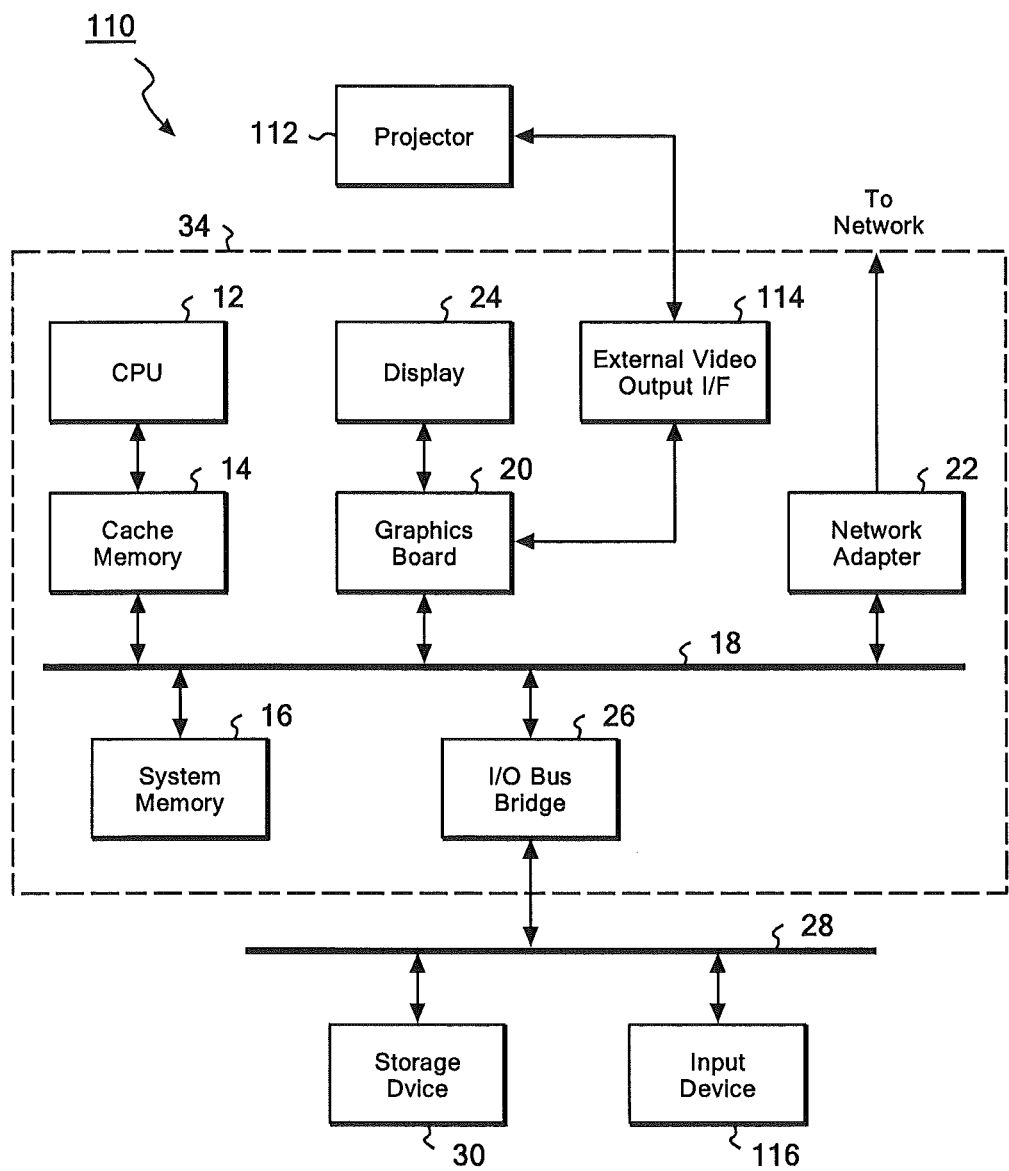
FIG. 14 is an illustration of a block diagram showing the hardware configuration of one or more clients in accordance with one embodiment.

FIG. 14 is an illustration of a diagram depicting hardware configuration of the clients 110 as per one embodiment. The client 110 shown in FIG. 14 is a computer device 34 such as a personal computer or workstation. The computer device 34 shown in FIG. 14 has a central processing unit (CPU) 12, a cache memory 14 with two levels (L1 and L2) for quick access of data used by the CPU 12, and a system memory 16 consisting of solid-state elements such as RAM or DRAM for processing of data by the CPU 12. The CPU 12, the cache memory 14, and the system memory 16 are connected via a system bus 18 to other devices or drivers such as a graphics board 20 and a network adapter 22. The graphics board 20 is connected to a main display 24 via a bus to display the processing results of the CPU 12 on the display screen. The graphics board 20 is also connected to an external output I/F 114 to display the processing results of the CPU 12 on an external video output device 112 connected to the computer device 34 via the external output I/F 114. The network adapter 22 connects the client 110 to a network 102 using the appropriate protocol such as TCP/IP at the physical level and link level. An I/O bus bridge 26 is also connected to the system bus 18. A storage device 30 such as a hard disk is connected downstream from the I/O bus bridge 26 via an I/O bus 28 such as PCI using IDE, ATA, ATAPI, serial ATA, SCSI, or USB. An input device 116 such as a keyboard, mouse, or other pointing device is connected to the I/O bus 28 via a bus such as a USB. The CPU 12 in the computer device 34 can be a serial core processor or a multicore processor, and is controlled by the appropriate operating system such as Windows XP®, Windows 7®, UNIX® or LINUX®. The messaging server 150 and the user information managing server 160 can also be realized using a hardware configuration similar to the one in FIG. 14.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

Further, as will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. For the purposes of this description, a computer usable or computer readable medium can be any apparatus that can contain, store, communicate, propagate, or transport the program for use by or in connection with the instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A messaging system comprising:
    a plurality of information processing devices communicating via a network;
    an output status determining unit for verifying a first information processing device is connected to a video output device, said output status determining unit also having an output status sensing module for providing an output status of the video output device by detecting signals outputted from said first information processing device to said video output; and
    a message processing unit configured to provide a message on said first information processing device in a certain manner based on a display regulation policy, wherein the display regulation policy correlates a manner of display of the message with the output status of the video output device,
    wherein the output status of the video output device comprises at least one of unconnected, connected, projecting and preparing to for projection.

2. The messaging system of claim 1, wherein said message processing unit is configured to provide one or more messages using additional displays; said displays indicating status of said first information processing device in accordance with its connection with said video output device.

3. The messaging system of claim 2, wherein said criteria and/or said manner of providing said message is based on sender of said message.

4. The messaging system of claim 2, wherein said criteria and/or said manner of displaying said message is dependent on a manner of reply.

5. The messaging system of claim 4, wherein the additional displays includes event processing for acquiring user information disclosed by said first information processing device.

6. The messaging system of claim 4, wherein said display provides said status of said first information processing device.

7. The messaging system of claim 1, wherein the output status determining unit includes an output status sensing module.

8. The messaging system method of claim 1, further comprising an output status estimating module for estimating said output status from input operations performed using said first information processing device.

9. The messaging system of claim 1, wherein a limited display is provided that includes hiding or substituting some or all said message.

10. The messaging system of claim 1, wherein said manner of display is provided according to a policy.

11. The messaging system of claim 10, wherein said policy includes conditions for limited display, and for performing limited display in response to meeting conditions of said message.

12. The messaging system of claim 11, wherein said policy provides restricted display.

13. The messaging system of claim 10, wherein said policy includes conditions for denying display of a message conditioned by a plurality of attribute information of sender or recipient of said message.

14. The messaging system of claim 10, wherein display of said message is allowed based on one or more conditions provided by a specific expression included in said message.

15. The messaging system of claim 10, wherein display of said message is restricted based on one or more conditions provided by a specific expression included in said message.

16. A messaging device comprising:
a plurality of information processing devices communicating via a network;
an output status determining unit for determining a connectivity status of a video output device and one of said information processing devices;
a message processing unit for processing a message to be sent or received by at least one of said information processing devices in accordance to a policy; and
an output status sensing module for providing an output status of the video output device by detecting signals outputted from said first information processing device to said video output wherein said status determines if a message cannot be subsequently displayed based on one or more conditions in a policy,
wherein the output status of the video output device comprises at least one of unconnected, connected, projecting and preparing to for projection.

17. A method comprising:
establishing, by a messaging server, processing communication between a plurality of information processing devices via a network;
determining, by a first information processing device, connectivity status based on the first information processing device of said information processing devices being connected to a video output device;
determining an output status of the video output device based on detected signals outputted from said first information processing device to said video output;
processing messages via a message processing unit; said message being sent or to be received by one or more of said information processing devices; and
displaying said message in accordance with a policy based on the output status of the video output device wherein said message is not displayed if it meets certain conditions in said policy,
wherein the output status of the video output device comprises at least one of unconnected, connected, projecting and preparing to for projection.

18. A non-transitory computer program product for message processing, the non-transitory computer program product comprising a computer readable storage medium having computer readable program code embodied therewith, said computer readable program code being executable by a computer to:
establishing, by a messaging server, processing communication between a plurality of information processing devices via a network;
determine, by a first information processing device, connectivity status based on a first information processing device of said information processing devices being connected to a video output device;
determine an output status of the video output device based on detected signals outputted from said first information processing device to said video output;
process messages via a message processing unit; said message being sent or to be received by one or more of said information processing devices; and
display said message in accordance with a policy based on the output status of the video output device wherein said message is not displayed if it meets certain conditions in said policy,
wherein the output status of the video output device comprises at least one of unconnected, connected, projecting and preparing to for projection.

* * * * *